US010637763B2

(12) United States Patent
Tao et al.

(10) Patent No.: US 10,637,763 B2
(45) Date of Patent: *Apr. 28, 2020

(54) COMPUTING SYSTEM IMPLEMENTING AN ON-DEMAND TRANSPORT SERVICE BASED ON SUB-REGIONAL UTILIZATION CONDITIONS

(71) Applicant: Uber Technologies, Inc., San Francisco, CA (US)

(72) Inventors: Christine Tao, San Francisco, CA (US); Navya Rehani, San Francisco, CA (US); Thomas McConnell, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/115,912

(22) Filed: Aug. 29, 2018

(65) Prior Publication Data

US 2018/0375752 A1    Dec. 27, 2018

Related U.S. Application Data

(63) Continuation of application No. 15/908,181, filed on Feb. 28, 2018, now Pat. No. 10,091,084, which is a
(Continued)

(51) Int. Cl.
*H04L 12/26* (2006.01)
*H04L 29/08* (2006.01)
(Continued)

(52) U.S. Cl.
CPC .......... *H04L 43/10* (2013.01); *H04L 12/1895* (2013.01); *H04L 41/5051* (2013.01);
(Continued)

(58) Field of Classification Search
CPC . H04L 43/10; H04L 12/1895; H04L 41/5051; H04L 41/5095; H04L 51/20; H04L 67/26; H04L 67/20; H04W 4/021
See application file for complete search history.

(56) References Cited

U.S. PATENT DOCUMENTS 5,945,919 A   8/1999  Trask
6,356,838 B1  3/2002  Paul
(Continued)

FOREIGN PATENT DOCUMENTS

EP   2682868   1/2014
EP   2879410   6/2015
(Continued)

OTHER PUBLICATIONS

EESR in EP 16824968.8 dated Jan. 30, 2019.
(Continued)

*Primary Examiner* — Todd L Barker
(74) *Attorney, Agent, or Firm* — Mahamedi IP Law LLP (57) ABSTRACT

A computing system can implement an on-demand transport service by determining utilization conditions for a plurality of sub-regions of a geographic region. The utilization condition for each sub-region can correspond to a number of available drivers within the sub-region as compared to a number of transport requests comprising pickup locations within the sub-region. Based on the utilization condition for a given sub-region exceeding the predetermined utilization threshold, the computing system can transmit data to the computing devices of a plurality of drivers to display a geofence feature, defined by three or more location data points, that encompasses the given sub-region, and a notification indicating that the given sub-region has a utilization condition that exceeds the predetermined utilization threshold.

20 Claims, 7 Drawing Sheets

Related U.S. Application Data continuation of application No. 14/219,862, filed on Mar. 19, 2014, now Pat. No. 9,960,986.

(51) Int. Cl.
*H04W 4/021* (2018.01)
*H04L 12/24* (2006.01)
*H04L 12/58* (2006.01)
*H04L 12/18* (2006.01)

(52) U.S. Cl.
CPC ............ *H04L 51/20* (2013.01); *H04L 67/26* (2013.01); *H04W 4/021* (2013.01); *H04L 41/5096* (2013.01); *H04L 67/20* (2013.01)

(56) References Cited

U.S. PATENT DOCUMENTS

| | | | |
|---|---|---|---|
| 6,453,298 B2 | 9/2002 | Murakami | |
| 6,756,913 B1 | 6/2004 | Ayed | |
| 7,248,184 B2 * | 7/2007 | Gelhar | G01C 21/3446 340/5.61 |
| 7,657,256 B2 | 2/2010 | Bates | |
| 7,817,990 B2 | 10/2010 | Pamminger | |
| 7,917,153 B2 | 3/2011 | Orwant et al. | |
| 8,065,342 B1 * | 11/2011 | Borg | G06Q 10/06 707/803 |
| 8,339,251 B2 | 12/2012 | Roberts | |
| 8,504,406 B2 | 8/2013 | Miller | |
| 8,538,374 B1 | 9/2013 | Haimo et al. | |
| 8,554,608 B1 | 10/2013 | O'Connor | |
| 8,624,727 B2 | 1/2014 | Saigh et al. | |
| 8,719,391 B2 | 5/2014 | Hamalainen et al. | |
| 8,768,294 B2 | 7/2014 | Reitnour et al. | |
| 8,855,916 B2 | 10/2014 | Meredith et al. | |
| 9,147,335 B2 * | 9/2015 | Raghunathan | G08B 23/00 |
| 9,372,090 B2 | 6/2016 | Tucker | |
| 9,424,515 B2 | 8/2016 | Atlas | |
| 9,631,933 B1 | 4/2017 | Aula | |
| 2002/0143587 A1 | 10/2002 | Champernowne | |
| 2006/0235739 A1 | 10/2006 | Levis et al. | |
| 2007/0093247 A1 | 4/2007 | Yaqub | |
| 2008/0114629 A1 | 5/2008 | Pavlov | |
| 2008/0122691 A1 | 5/2008 | Carani et al. | |
| 2008/0125964 A1 | 5/2008 | Carani | |
| 2008/0195428 A1 | 8/2008 | O'Sullivan | |
| 2009/0006182 A1 | 1/2009 | Gammon | |
| 2009/0216600 A1 | 8/2009 | Hill | |
| 2010/0017126 A1 | 1/2010 | Holcman | |
| 2010/0280852 A1 | 11/2010 | Huang | |
| 2011/0112768 A1 | 5/2011 | Doyle | |
| 2011/0231493 A1 | 9/2011 | Dyor | |
| 2011/0238300 A1 | 9/2011 | Schenken | |
| 2011/0307282 A1 * | 12/2011 | Camp | G06Q 10/02 705/7.11 |
| 2012/0041675 A1 | 2/2012 | Juliver et al. | |
| 2012/0046110 A1 | 2/2012 | Amaitis et al. | |
| 2012/0089326 A1 | 4/2012 | Bouve | |
| 2012/0200411 A1 | 8/2012 | Best | |
| 2012/0232943 A1 | 9/2012 | Myr | |
| 2012/0306659 A1 | 12/2012 | Ben-Dayan | |
| 2013/0132140 A1 | 5/2013 | Amin | |
| 2013/0162425 A1 | 6/2013 | Raghunathan | |
| 2013/0290200 A1 | 10/2013 | Singhal | |
| 2013/0310053 A1 | 11/2013 | Srivastava et al. | |
| 2013/0332527 A1 | 12/2013 | Du | |
| 2013/0339076 A1 | 12/2013 | Baranda | |
| 2014/0066090 A1 | 3/2014 | Henderson | |
| 2014/0087711 A1 | 3/2014 | Geyer | |
| 2014/0108201 A1 | 4/2014 | Frechette | |
| 2014/0156410 A1 | 6/2014 | Wuersch | |
| 2014/0172727 A1 | 6/2014 | Abhyanker | |
| 2014/0279707 A1 | 9/2014 | Joshua | |
| 2014/0365250 A1 | 12/2014 | Ikeda | |
| 2015/0031388 A1 | 1/2015 | Chatterjee et al. | |
| 2015/0032484 A1 | 1/2015 | Mermelstein | |
| 2015/0148060 A1 * | 5/2015 | Parab | H04W 4/021 455/456.1 |
| 2015/0161564 A1 | 6/2015 | Sweeney | |
| 2016/0014561 A1 | 1/2016 | Inzer | |
| 2016/0191637 A1 | 6/2016 | Memon | |
| 2016/0217669 A1 | 7/2016 | Benoit | |
| 2017/0351977 A1 | 12/2017 | Bijor | |
| 2019/0087754 A1 | 3/2019 | Farrelly | |
| 2019/0149945 A1 | 5/2019 | Chheda | |
| 2019/0197460 A1 | 6/2019 | Truong | |

FOREIGN PATENT DOCUMENTS

| | | |
|---|---|---|
| KR | 10-2011-0061568 | 6/2011 |
| WO | WO 2003/040972 | 5/2005 |
| WO | WO 2013-166216 | 11/2013 |

OTHER PUBLICATIONS

Exam Report No. 1 in AU 2016293831 dated Aug. 28, 2019.
Exam Report in IN 201647031195 dated Oct. 30, 2019.
International Search Report in PCT/US2015/021227 dated Jun. 18, 2015.
International Search Report and Written Opinion in PCT/US2016/019895 dated Jun. 29, 2016.
IPRP in PCT/US2016/019895 dated Sep. 8, 2017.
EESR in EP 15765578 dated Oct. 25, 2017.
M.E.T. Horn, "Multimodal and demand-responsive passenger transport systems: a modeling framework with embedded control systems", Transportation Research Part A 36, 167-188 (2002) Year: 2000.

* cited by examiner

COMPUTING SYSTEM IMPLEMENTING AN ON-DEMAND TRANSPORT SERVICE BASED ON SUB-REGIONAL UTILIZATION CONDITIONS

CROSS-REFERENCE TO RELATED APPLICATION

This application is a Continuation of U.S. application Ser. No. 15/908,181, titled "Providing Notifications to Devices based on Real-Time Conditions Related to an On-Demand Service," and filed on Feb. 29, 2018; which is a Continuation of U.S. application Ser. No. 14/219,862, titled "Providing Notifications to Devices based on Real-Time Conditions Related to an On-Demand Service," and filed on Mar. 19, 2014, now U.S. Pat. No. 9,960,986; the aforementioned applications being hereby incorporated by reference in their entirety.

BACKGROUND

An on-demand service system can arrange for an on-demand service to be provided for a requesting user by selecting a service provider based on a variety of information. The on-demand service system can receive, for example, information about a plurality of service providers from respective computing devices operated by the service providers, and select a service provider based on the received information.

DETAILED DESCRIPTION

Examples described herein provide for a system that can provide notifications to driver devices based on real-time conditions related to an on-demand service. For example, a notification system receives information from driver devices as well as information from other resources to determine which driver device(s) is to receive which notification(s). Depending on real-time information, the notification system can automatically provide a particular notification to one driver device and provide another notification to another driver device. Notifications can provide useful information to service providers for purposes of improving on-demand service.

In some examples, the notification system can access a notification database that stores a plurality of notification entries. An entry for a notification can include a variety of information, such as a notification identifier (ID), text corresponding to the notification, location information associated with the notification, and condition information. As described herein, condition information for a notification includes one or more rules or requirements that are to be satisfied by a driver and/or the driver's device in order for that driver to receive the notification. Examples of condition information can include one or more of (i) information about one or more geographic regions in which a driver device is to be located and/or not located to receive the notification, (ii) driver's status information in which drivers having or not having a specific current state is to receive the notification, (iii) time information when the notification should be provided, or (iv) utilization information about drivers in a given geographic region.

According to an example, the notification system can receive information (e.g., periodically) from a plurality of driver devices as well as information from the dispatch system and/or other resources in order to determine which driver devices satisfy the condition information for the notification entries (if any). For each driver in a set of drivers, the notification system can compare, for example, information about that driver and current real-time conditions with the condition information for each notification entry in a set of notification entries. If a driver device meets the condition information for a particular notification entry, information corresponding to that notification entry can be transmitted to that driver device.

For example, a notification entry can correspond to a notification that warns a driver(s) of an unexpected danger or situation. Such a notification can be useful for drivers currently in a given geographic area (e.g., a region corresponding to a city, such as San Francisco, Calif.) in which the unexpected danger is present (e.g., a fire at a building in San Francisco, Calif.). In other examples, the notification entry can specify a plurality of geographic regions, such as multiple sub-regions of a given area (e.g., sub-regions of a city area), in which drivers that are in such sub-regions are to receive a first notification text and drivers that are outside those sub-regions are to receive a second notification text (or no notification at all). In this manner, a driver that receives the notification can prepare for delays due to traffic or be deterred from driving towards the area where the danger is present, thereby improving the efficiency and safety of the services.

As an addition or an alternative, only those drivers that currently have a status of "on-duty," "en route," or "providing transport" may be specified to receive the notification instead of all drivers. This can exclude drivers that are "off-duty" and not currently active from receiving information when they are not planning on providing any service. In another example, a notification entry can specify that a notification be transmitted to select drivers when utilization conditions are satisfied. The notification system can receive utilization information from the dispatch system for a given geographic region. The utilization information can correspond to current supply and demand conditions for the transport service, such as a ratio of drivers that are providing service as compared to all drivers or the ratio of drivers that are available as compared to users in the given geographic region. For example, the notification entry can instruct the notification system to message only those drivers that are positioned outside of a certain sub-region when utilization in that sub-region is equal to or higher than a predetermined threshold (e.g., 80%).

In some examples, the notification system also provides a user interface component that enables a user, such as an administrator of the notification system, to create, edit, or delete notification entries. The user can configure the condition information for a notification entry as well as the notification text and location information that is to be provided to a driver device.

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with a notification system and/or a dispatch system over a network. A driver device can also correspond to taxi meters, other metering devices of a transit object, or custom hardware, etc. The client device and/or the driver device can also each operate a designated service application configured to communicate with the notification system and/or the dispatch system. Still further, while some examples described herein relate to transport services, the systems describe herein can be used to provide other on-demand services, such as a food truck service, a delivery service, an entertainment service, etc.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
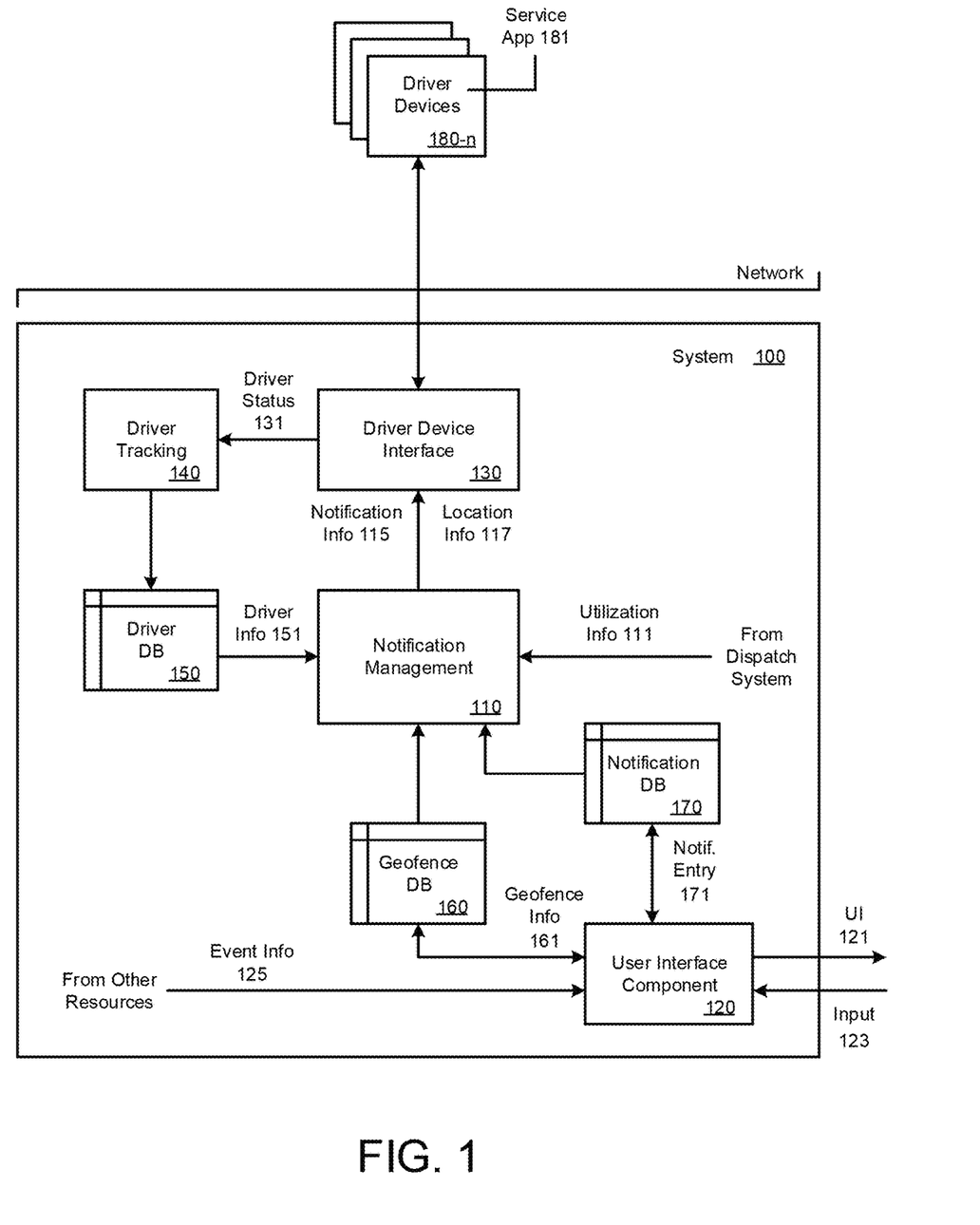
FIG. 1 illustrates an example system to provide a notification to a driver device based on real-time conditions.

FIG. 1 illustrates an example system to provide a notification to a driver device based on real-time conditions. According to an example, a notification system, such as system 100, can automatically provide various notifications to different service providers based on real-time conditions pertaining to an on-demand service system. The notification system can use information received from devices operated by service providers as well as other information related to the on-demand service system to determine which notification(s), if any, is to be pushed or transmitted to one or more service providers. In this manner, the notification system can dynamically select a service provider to receive a specific notification when that service provider satisfies conditions for that notification.

In some examples, system 100 can include notification management 110, user interface component 120, driver device interface 130, driver tracking 140, and a plurality of databases. The databases can include at least a driver database 130 that stores information about drivers and their states, a geofence database 160 that stores information about regions and/or sub-regions, and a notification database 170 that stores notification entries. The components of system 100 can combine to receive information from driver devices 180 and/or other resources, and determine which, if any, driver devices are to receive a notification. Logic can be implemented with various applications (e.g., software) and/or with firmware or hardware of a computer system that implements system 100.

Depending on implementation, one or more components of system 100 can be implemented on a computing device, such as a server, laptop, PC, etc., or on multiple computing devices that can communicate with driver devices 180 over one or more networks. In some examples, a computing device can operate or execute an application to perform one or more of the processes described by the various components of system 100. System 100 can also be implemented through other computer systems in alternative architectures (e.g., peer-to-peer networks, etc.).

System 100 can communicate, over one or more networks via a network interface (e.g., wirelessly or using a wire), with driver devices 180 (e.g., mobile computing devices operated by drivers) using a driver device interface 130. Although not shown in FIG. 1, system 100 can also communicate with client devices (e.g., mobile computing devices operated by clients or users/customers) using a client device interface. A device interface, such as a driver device interfaced 130, can enable and manage communications between system 100 and each of the driver devices 180. In some examples, the driver devices 180 can individually operate a designated service application 181 that can interface with the driver device interface 130 to communicate with system 100. According to some examples, the applications can include or use an application programming interface (API), such as an externally facing API, to communicate data with the driver device interface 130. The externally facing API can provide access to system 100 via secure access channels over the network through any number of methods, such as web-based forms, programmatic access via restful APIs, Simple Object Access Protocol (SOAP), remote procedure call (RPC), scripting access, etc.

According to some examples, system 100 can communicate with or be a part of a dispatch system for an on-demand service (and generally, an on-demand service system). Examples of an on-demand service can include a transport service, a food truck service, a delivery service, a traveling entertainment service, etc. A dispatch system for a transport service, for example, can receive requests from users operating client devices and arrange for transport services to be provided to the users by service providers (e.g., drivers). The driver devices 180 can provide current or real-time information about the drivers to the dispatch system and/or system 100, and based, at least in part, on the driver information, the dispatch system can determine the pricing for the transport service in a given geographic region, can select a driver for a requesting user, can determine if the transport service has been successfully completed, etc. System 100, via the notification management 110, can also use the real-time information about the drivers in order to provide a notification(s) to driver(s).

System 100 can receive driver information from a plurality of driver devices 180 via a driver device interface 130. In one example, each driver that is registered with and has an account with the transport service system can operate a driver device 180 that includes the service application 181 that is specific to and associated with the on-demand transport service system. Depending on implementation, the service application 181 can provide driver information, such as the driver status information 131 and/or the current location of a driver device 180, to system 100 periodically and/or intermittently in response to driver input.

For example, the driver tracking 140 can periodically receive driver status information 131 and/or the current location information of a driver device 180 from the plurality of driver devices 180 at every time interval (e.g., every four seconds). As an addition or an alternative, the driver tracking 140 can also receive driver status information 131 and/or current location information in response to the driver providing an input via the service application 181. The driver status information 131 can specify the status of a particular driver, such as whether the driver is (i) on-duty and available (e.g., is waiting for a transport request), (ii) currently providing transport to a user and unavailable, (iii) in progress to a pickup location to provide transport but has not yet provided transport (e.g., has accepted a transport request and is en route), and/or (iv) non-active or off-duty (e.g., is not working, is having vehicle problems, etc.). The status information 131 can also include respective time and location information (which can be determined by a GPS component of the driver's device 180), such as the time and location when the driver inputted the driver's status (e.g., the time and location when the driver has completed providing transport service or when the driver has accepted a transport request).

The driver tracking 140 can store the driver status information 131 in the driver database 150. For example, the driver database 150 can include a plurality of entries, with each entry of a driver having a driver identifier (ID) and corresponding to the driver's account or profile with the transport service system. The driver tracking 140 can update the entries in the driver database 150 with real-time driver status information 131 for each respective driver using the driver IDs. The notification management 110 can access the driver database 150 to receive or retrieve the driver information 151 (e.g., periodically, based on a schedule, or intermittently triggered by user input). In one example, the notification management 110 can be configured by an administrator of system 100 and/or the dispatch system to check whether a notification(s) is to be transmitted periodically, such as every four seconds, or whenever the driver information 151 is updated by the driver tracking 140. Although the driver tracking 140 and/or the driver database 150 are shown in the example of FIG. 1 as being part of system 100, in other examples, the driver tracking 140 and/or the driver database 150 can be a part of the dispatch system.

The notification management 110 can access the driver database 150 as well as other databases, such as the geofence database 160 and the notification database 170 in order to determine when to transmit a notification to a driver device(s) 180 and to determine which driver device(s) 180 to transmit the notification to. The notification database 170 can include a plurality of notification entries 171 that each corresponds to a notification. Depending on implementation, an entry 171 for a notification can include a notification identifier (ID), text corresponding to the notification (e.g., "Santa-con has ended"), audio data corresponding to the notification, location information associated with the notification, and condition information.

In addition, an entry 171 for a notification can include condition information. Condition information can include one or more rules or requirements that are to be satisfied by a driver and/or the driver's device 180 in order for that driver device 180 to receive the particular notification. Examples of condition information can include one or more of (i) information about one or more geographic regions in which a driver device 180 is to be located and/or not located to receive the notification, (ii) driver's status information in which drivers having or not having a specific current state is to receive the notification, (iii) time information when the notification should be provided, or (iv) utilization information about drivers in a given geographic region. In one example, geographic regions that are specified and used as part of the condition information can be associated with or correspond to geofences that are stored in a geofence database 160.

As described herein, a geofence can correspond to an area that is encompassed by a perimeter (or circumference in the case of a circle or ellipse shape, for example). The perimeter can be defined by three or more location data points (e.g., a latitude and a longitude coordinate). A geofence can be stored in a geofence database 160 of system 100 (and/or of the on-demand service system) along with geofence information 161 for that geofence. For example, the geofence information 161 of a geofence can include a geofence identifier (ID), a geofence name (e.g., a user-friendly name), a create or edit time, a plurality of location data points that define the geofence, and/or other information about the geofence. A particular geographic area, such as the city area of San Francisco, Calif., for example, can include a plurality of geofences having different sizes and covering different regions and sub-regions of regions (including geofences that at least partially overlap other geofence(s)). Depending on implementation, a user or administrator of system 100 (and/or of the on-demand service system) can create, edit, or delete a geofence by interacting with a user interface 121, such as a geofence user interface, and providing inputs 123 on the geofencing user interface. In some examples, one or more geofences can be created programmatically by system 100 and/or the transport service system using historical information and/or mapping information of a given geographic area.

The user interface component 120 can also enable a user or administrator of system 100 to create, edit, and/or delete a notification entry 171. For example, the user interface component 120 can provide a user interface 121, such as a notification editing user interface, that enables the user to create a notification entry 171 and specify the different information for the notification by providing inputs 123. As discussed, the notification database 170 can store a plurality of notification entries 171. The notification entries 171 can correspond to different notifications, such as warnings, helpful hints, event information, etc., for example, that can assist a service provider, such as a driver, to better position the driver's vehicle for receiving transport request invitations and to better plan the routes to take when driving to pick up a user or to drop off a user. The user interface component 120 can receive user inputs for a notification entry 171 and store the notification entry 171 in the notification database 170 for use by the notification management 110.

For example, the notification editing user interface can provide selectable features that enable a user to input the notification information for a notification entry 171. The user can input a user-friendly name for the notification entry 171 (e.g., "7 pm weekday baseball game"), a text for the notification (e.g., "Game has ended at AT&T park"), location information (e.g., an address or a name of a location, such as "3rd St. and King St." or "AT&T Park") related to the notification, and condition information. The condition information, in this example, can include one or more geofences that specify an area in which driver devices should be or should not be in order to receive the notification corresponding to the notification entry 171. The user can specify a geofence(s) that a driver device has to be in to receive the notification for the notification entry 171 and/or a geofence(s) that a driver device must not be in to receive the notification. For example, the user can configure the notification entry 171 so that drivers that are in a particular geofence or set of geofences receive the notification and/or explicitly configure the notification entry 171 so that drivers that are in a geofence that encompasses the location information (e.g., "AT&T Park" in San Francisco, Calif.) or in a geofence(s) that is adjacent to or proximate to that geofence do not receive the notification.

The notification editing user interface can also provide selectable features that enable the user to configure other condition information including status information, such what status a driver should currently be in to receive the notification (e.g., "on duty" or "active" or currently providing transport, etc.) or should not be in (e.g., "off duty"), and time information, such as when the notification should be transmitted to a selected driver device(s). For example, the user can specify the time condition to be 10 pm, such as an estimated time in which the baseball game would be completed for a typical 7 pm weekday baseball game. In this manner, such a notification entry 171 can be used by the notification management 110 to transmit a notification for that entry 171 numerous times (e.g., five nights during the week when there are five weeknight baseball games that start around 7 pm) to selected driver devices, provided that the driver devices satisfy the conditions of the notification entry 171.

The user is also enabled, via the user interfaces 121, to configure the condition information related to utilization. The utilization information can correspond to current supply and demand conditions for the transport service, such as a ratio of drivers that are providing service as compared to all drivers or the ratio of drivers that are available as compared to users in the given geographic region. Referring back to the example discussed, the user can configure the notification entry 171 using a utilization condition, in which the notification message "Game has ended at AT&T park notification" is provided to those drivers that satisfy the other conditions only when the utilization of the current state of the on-demand service in the geofence (that encompasses AT&T Park) is equal to or higher than a predetermined threshold (e.g., 80%). In such an example, drivers that are in specified geofences would be notified that a baseball game has ended when utilization of drivers are high (e.g., there is a lot of demand for transport services and not enough supply of drivers) in the geofence that encompasses AT&T Park, thereby providing drivers useful hints to improve their services and improve the efficiency of the on-demand service system.

The notification management 110 can access the notification database 170 and check or determine which driver devices(s) are to receive a notification(s), if any. For example, the notification management 110 can periodically check current/real-time conditions and compare them to the condition information of the notification entries 171 in the notification database 170 (e.g., every four seconds or every ten seconds, etc.). At a designated time to perform a check, the notification management 110 can, in any order or simultaneously, (i) determine the current time, (ii) receive or retrieve driver information 151, including location information and status information, and (iii) receive or retrieve utilization information 111 for geofences from the dispatch system. Using this information (e.g., real-time or close-to-real-time information), the notification management 110 can determine which drivers or driver devices 180, if any, satisfy the condition information of the notification entries 171 by comparing the received information with the condition information and determine which notification(s) to transmit. In this manner, the notification system 110 can filter, using the condition information, which driver(s) is to receive a notification(s) at a given time and which notification(s) to receive.

For a driver device 180 that has been determined to receive a notification, the notification management 110 can identify the corresponding notification entry 171 and transmit notification information 115 and location information 117 of the identified notification entry 171 to the driver device 180. In some examples, the notification information 115 can enable the service application 181 operating on the driver device 180 to display the notification text (e.g., "Game has ended at AT&T Park") in a designated region of the user interface of the service application, and/or output an audio message of the notification text (e.g., so that the driver does not have to read the message and instead, hear the message while the driver is driving) using the speakers of the driver device 180. In addition, the location information 117 corresponding to the notification (e.g., the location data point corresponding to AT&T Park) can be provided to the service application 181 so that the service application 181 can display a graphic marker or feature on a map user interface of the service application 181. In this manner, the map user interface can include a marker identifying the current location of the driver as well as the marker identifying a location associated with or corresponding to the notification entry 171.

According to some examples, system 100 can also interface with other resources, such as third-party websites or services, traffic systems, emergency systems, venue schedules, etc., in order to receive additional information and data for purposes of creating notifications and/or providing notifications. System 100 can receive, from other resources, event information 125 about events or incidences that are currently occurring or will occur. Examples of event information 125 can include what the event is (e.g., a traffic accident, a flood, an emergency, road closure, a fire, a concert, a sporting event, a protest, etc.), time information for the event (e.g., when the event has started or will start, when the event will end, etc.), and/or location information for the event. System 100 can receive event information 125 in order to enable a user to create notifications for certain events, in an effort to better inform drivers for purposes of providing on-demand transport services. The user can view event information 125 to configure the condition information for a notification entry 171.

As an addition or an alternative, a user can configure a generic notification entry 171, such as a notification for a warning, pertaining to a particular type (e.g., traffic or traffic accident). The generic notification entry 171 can be specified with a generic text ("Warning: blank"), but without a particular location and without other specified information. In this manner, the notification management 110 can dynamically include information in the generic notification entry 171 to provide different notifications based on a specific situation. The notification management 110 can be configured to periodically check or access event information 125 to determine if any events pertaining to the specified type have occurred and use the generic notification entry 171. In this example, the notification management 110 can receive event information 125 related to traffic or traffic accidents from a traffic system or mapping system. If the notification management 110 determines an event has occurred that meets the type of the generic notification entry 171, the notification management 110 can identify relevant information for the event, such as the location information or data point of the event (e.g., a street corner or address, or freeway number and exit), the timing of the event (e.g., when the event occurred) and a description of the event (e.g., "traffic accident"). The notification management 110 can then use the generic notification entry 171 as a template for a notification to transmit to appropriate driver devices 180 and fill in the respective fields for the notification entry 171.

Condition information for the generic notification entry 171, for example, can include (i) geographic conditions, such as a general geographic region (e.g., area of San Francisco, Calif.) in which drivers should be located in or a radius (e.g., by distance or by estimated travel time) from the location data point of the event in which drivers should be located in, and (ii) status information of the driver devices. The notification management 110 can identify the location of the event, include the description of the event in the generic text (e.g. "Warning: traffic accident"), identify drivers that meet the condition information, and transmit the notification to the appropriate driver devices. In this manner, system 100 can enable automated or semi-automated notification generation and delivery.

Although only one notification system 100 (e.g., and only one notification management and one notification database 170) is illustrated in FIG. 1, as an addition or an alternative, a plurality of notification systems can be used by the transport service system for a plurality of different geographic regions. For example, system 100 and components can be used for a particular geographic region, such as the Bay Area of California, whereas another similar system and components can be used for another region, such as Los Angeles and surrounding areas.

Methodology

Figure 2:
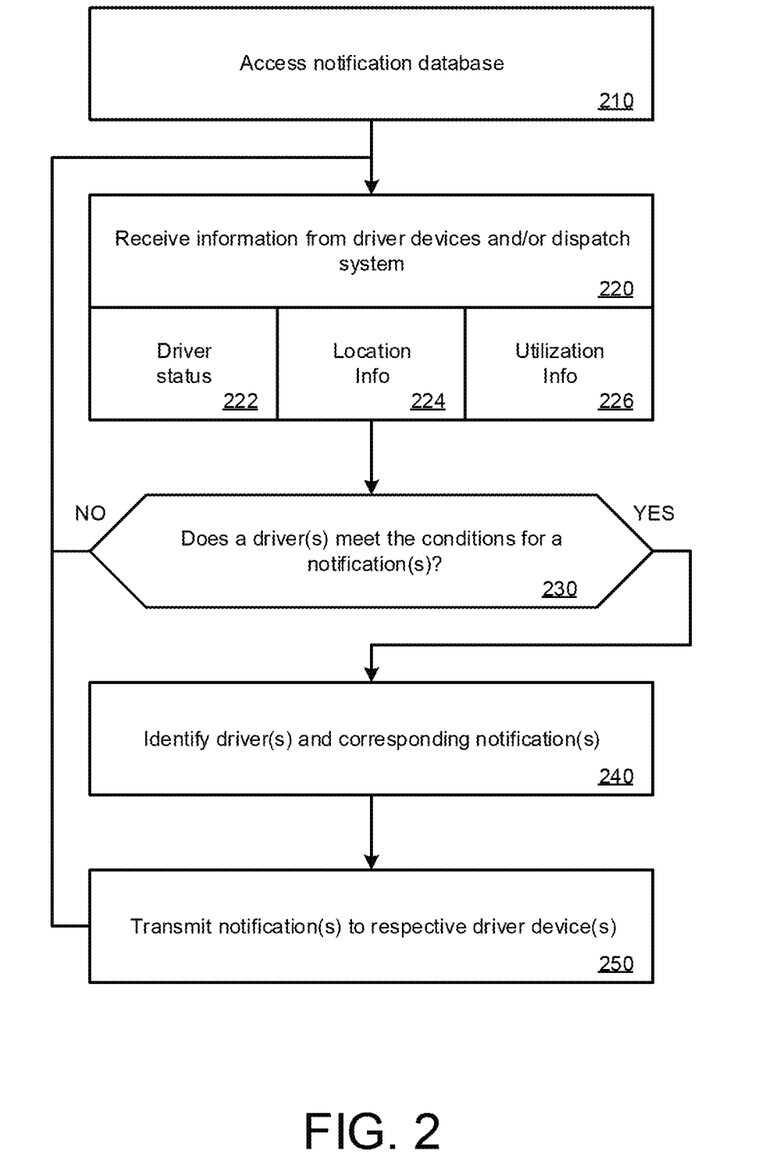
FIG. 2 illustrates an example method for providing a notification to a driver based on real-time conditions.

FIG. 2 illustrates an example method for providing a notification to a driver based on real-time conditions. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

Referring to FIG. 2, the notification management 110 can access a notification database 170 stored in a memory resource (210). The notification database 170 can store a plurality of notification entries 171. Each entry 171 of a notification can include a notification ID, notification text, notification audio data, notification location information or data point, and condition information. In some examples, condition information of a notification entry 171 can include geographic conditions that are to be satisfied by a driver and/or driver device in order for that driver device 180 to receive the notification. As an example, the geographic condition can be specified using one or more geofences that are configured by system 100 and/or the dispatch system.

As an example, the city area of San Francisco, Calif. can be represented by a geofence, identified as Geofence1 (e.g., the geofence ID). In addition, a plurality of geofences each covering different (and smaller) areas of San Francisco can be stored in the geofence database 160, such as Geofence2, Geofence3, Geofence4, Geofence5, etc. A user can create and configure a notification entry for notifying drivers that a concert at a venue located at 999 4th St., San Francisco, Calif. (e.g., Venue1) will end at 9 pm (e.g., the notification audio and/or text can state "Concert has ended at Venue1"). The user can also configure the geographic condition information for the notification entry by specifying that only those drivers located in particular geofences are to receive the notification. For example, Venue1 can be located in Geofence6, and the user can specify that only drivers located in Geofence4, Geofence5, Geofence7, and Geofence12 are to receive the notification.

The notification management 110 can receive information from driver devices 180 and/or information from the dispatch system or other resources (220). For a given geographic region, such as San Francisco, the notification management 110 can receive information from driver devices 180 that are located in or near San Francisco (e.g., within Geofence1). Depending on implementation, the information received can include driver status information of the driver devices (222), the location information for the driver devices (224), and/or the utilization information (226) of the given geographic region (e.g., utilization information of Geofence1 as a whole or utilization information of individual sub-regions or geofences within Geofence1). The notification management 110 can receive the information periodically, based on a set schedule, or in response to user input.

The notification management 110 can use the information to determine whether a driver(s) or respective driver device(s) satisfies the condition information for one or more notification entries (230). As discussed, only those driver devices that satisfy the condition information for a notification entry (e.g., geographic condition information, driver status condition information, time condition information, and/or utilization condition information) is selected to receive the corresponding notification. If no driver devices are determined to meet the condition information, the notification management 110 does not transmit a notification, but instead performs the next iteration of receiving information and then determining again whether a driver device(s) satisfies the condition information.

If the notification management 110 determines that at least one driver or driver device meets the condition information for at least one notification, the notification management 110 identifies or selects the driver device and the corresponding notification (240). The notification management 110 can then transmit information about the notification to the identified driver (250). The notification management 110 can then repeat the process discussed.

User Interface

Figure 3A:
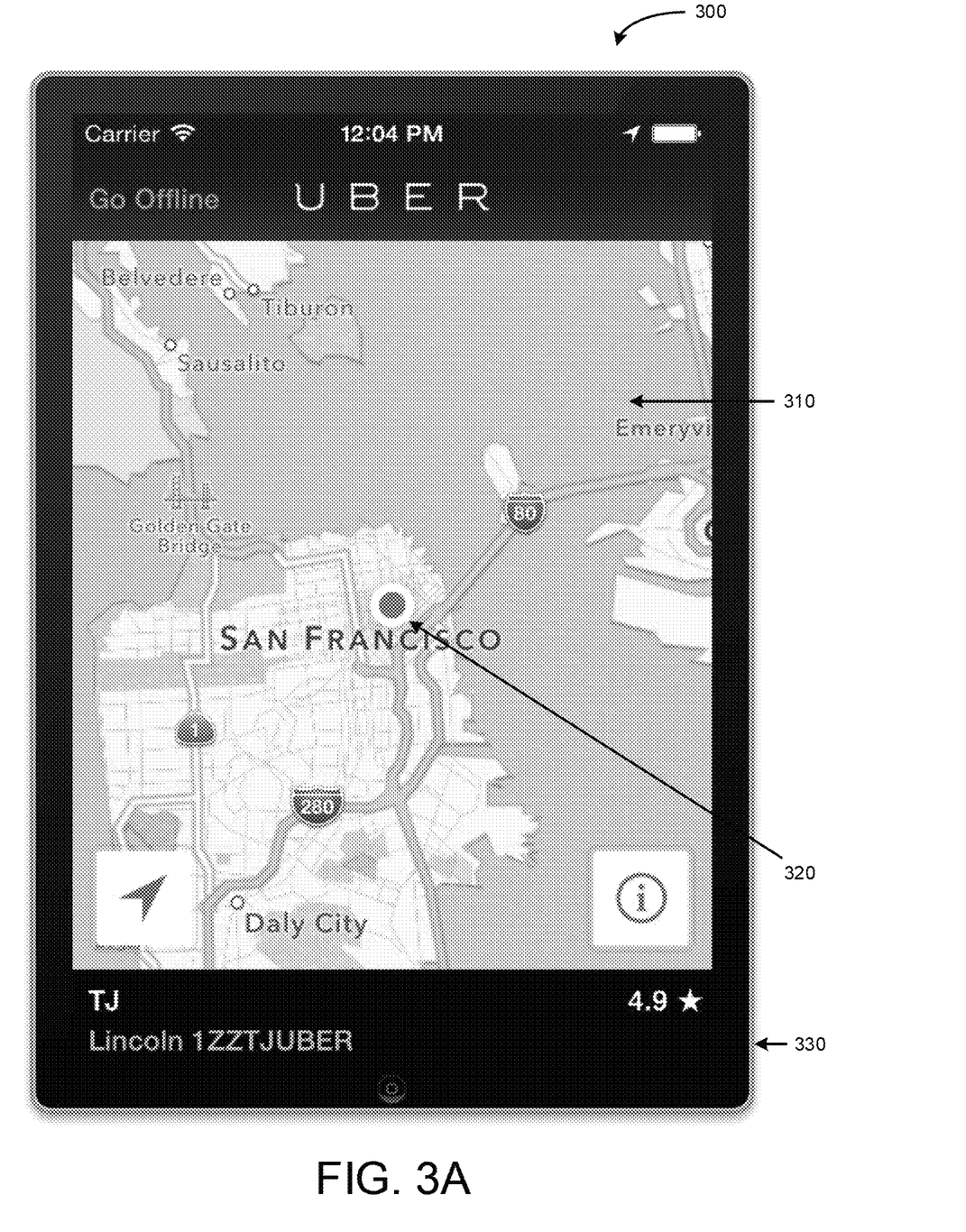
FIGS. 3A through 3C are example user interfaces depicting a service application that is operated on a driver device.
Figure 3B:
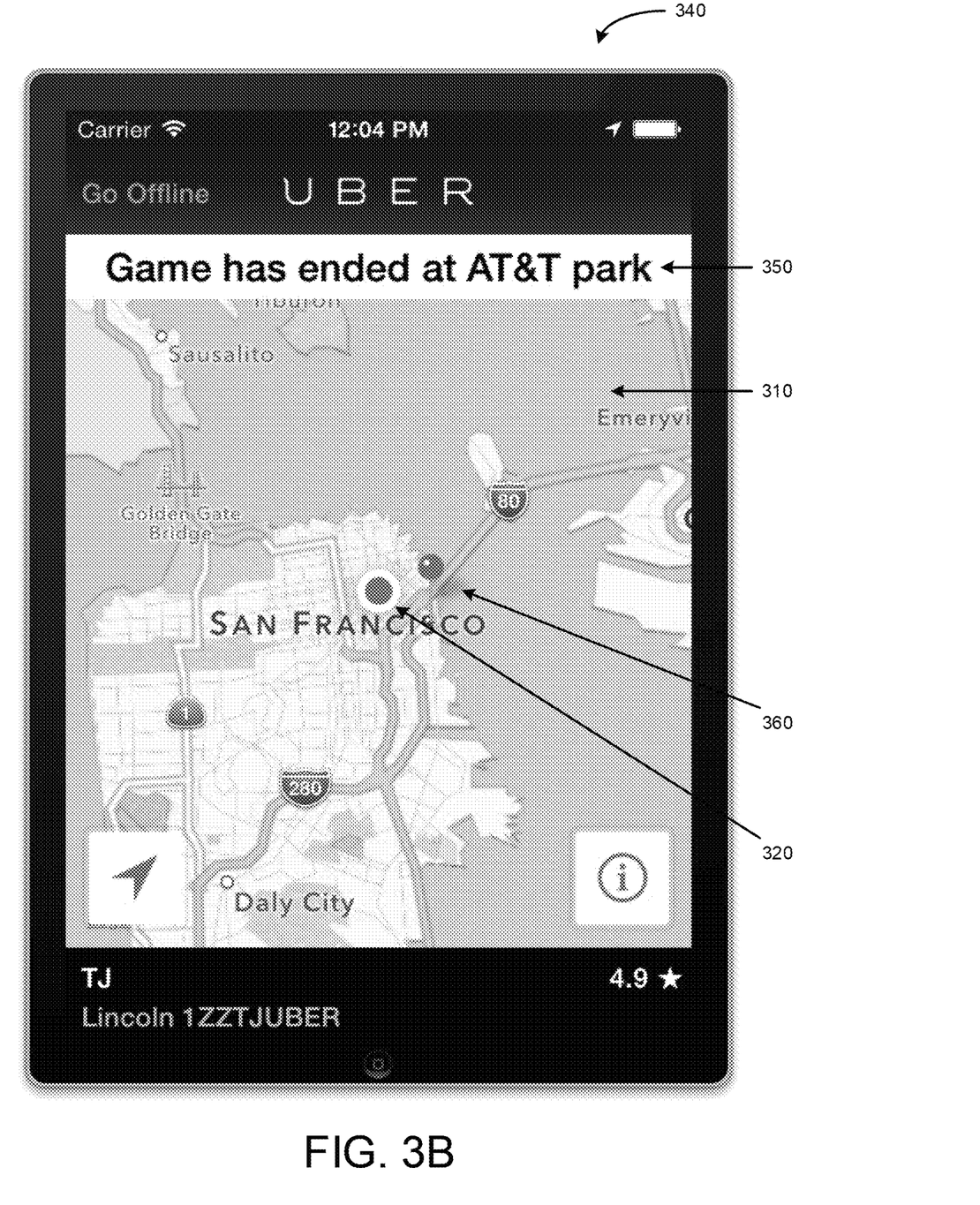
Figure 3C:
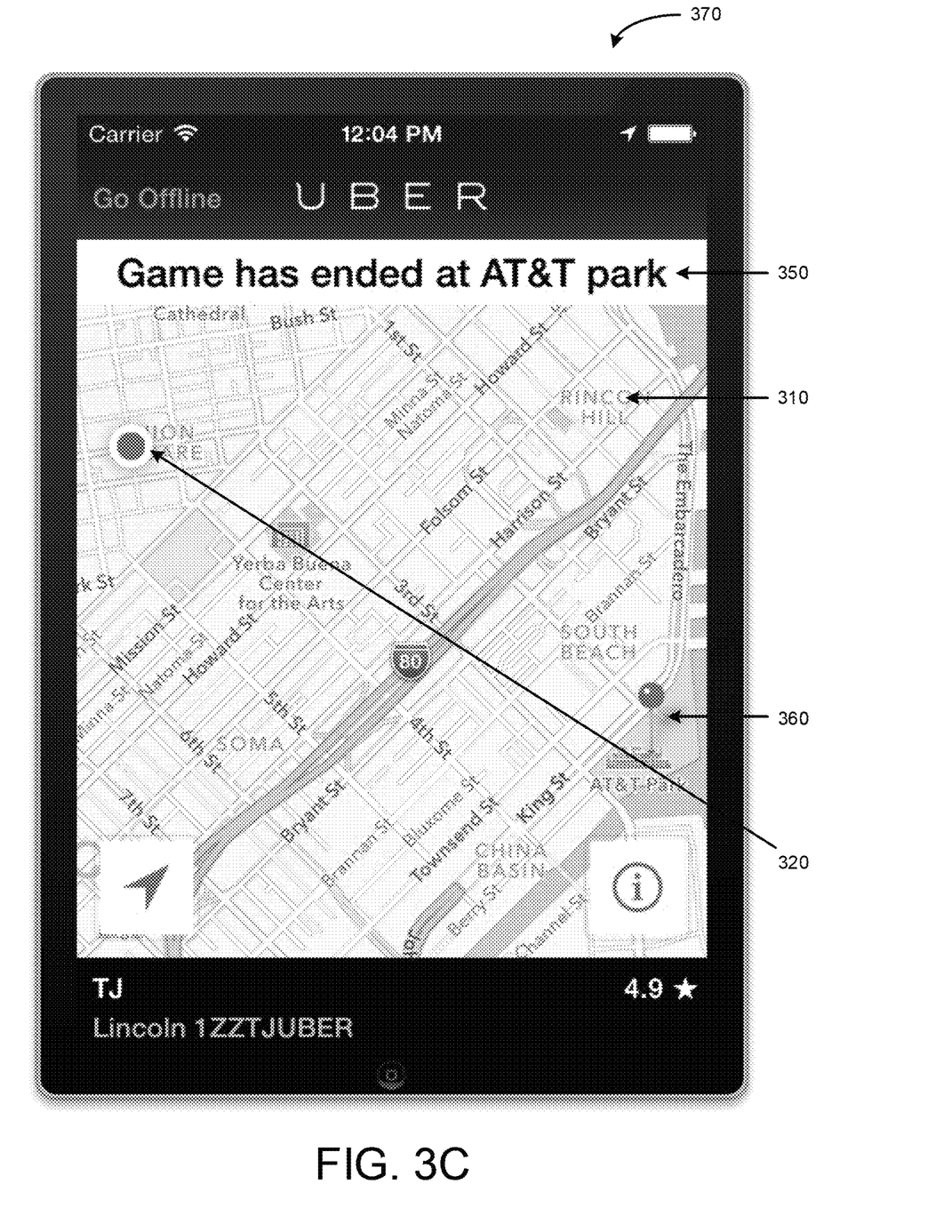

FIGS. 3A through 3C are example user interfaces depicting a service application that is operated on a driver device. The user interfaces 300, 340, 370, such as described by examples of FIGS. 3A, 3B, and 3C, respectively, can be provided using, for example, components described with an example of FIG. 1. In one example, the user interfaces 300, 340, 370 can each correspond to a user interface that is displayed on a mobile computing device of a service provider as part of a service application.

In FIG. 3A, a service application running on a driver device can provide a user interface 300. The user interface 300 can include a map 310 along with a marker 320 indicating the driver's current location. The user interface 300 can also include a section 330 showing driver information, such as the driver's name (e.g., "TJ"), the driver's vehicle type and/or identifier and a rating of the driver. Other features of the user interface 300 can include a status feature, that the driver can select to change the status. The status feature shown in FIG. 3A is illustrated with text "Go Offline," indicating that the driver is currently "active" or "on-duty." Depending on an example, the user interface 300 can be displayed to the driver when the driver is active, idle, and/or waiting for a transport request invitation from the on-demand transport service system.

During the time when the user interface 300 is displayed, the service application can concurrently and periodically transmit status information and/or location information of the driver to the on-demand transport service system (and/or the notification system, as discussed in FIG. 1). If the driver is currently moving, the marker 320 can move on the map accordingly and the service application can periodically transmit the updated location information to the on-demand service system.

When the notification system determines that the driver device is to receive a notification (e.g., based on the driver device's current location, for example, and other condition information that has been satisfied), the notification system can identify the driver device and the notification, and provide the corresponding notification information to the driver device. As illustrated in FIG. 3B, the user interface 340 is similar to the user interface 300 of FIG. 3B, except that the user interface 340 now includes a notification bar or feature 350 showing the notification text or message (e.g., "Game has ended at AT&T park"). In response to receiving the notification information from the notification system, the service application can cause the notification bar or feature 350 to be dynamically displayed in a designated region of the user interface 340. In addition to the map 310 and the marker 320 indicating the driver's current location, the service application can determine the location data point corresponding to the notification from the notification information and also display a second marker 360 on the map 310 showing the location of AT&T Park.

In another example, the notification information received from the notification system can also include audio data corresponding to the notification text. The service application can interface with the speaker(s) of the driver device (e.g., using an API) and cause audio data corresponding to the notification text to be outputted in the form of speech. In this manner, the driver can hear the notification rather than looking at the display when a notification is received.

As an addition or an alternative, the service application can cause the map 310 to be zoomed in (or zoomed out) from a first view at a time before the notification was received (e.g., as seen in the user interface 300 of FIG. 3A) to a second view (e.g., the zoomed in or zoomed out view) as the notification is being received and/or in response to receiving the notification. The map 310 can be adjusted to more clearly illustrate the location data point related to the notification. For example, in FIG. 3C, the user interface 370 shows the map 310 that is zoomed in showing a more detailed view of the area in which the driver is currently located (identified by the marker 320) as well as the location data point of AT&T Park (identified by the marker 360). In this manner, receiving the notification information from the notification system can cause the service application to provide information that can better assist the driver during the course of the driver's service. In some examples, other features can also be displayed based on the notification information, such as other text, an image, or a video associated with the notification entry and transmitted to the driver device from the notification system.

Hardware Diagram

Figure 4:
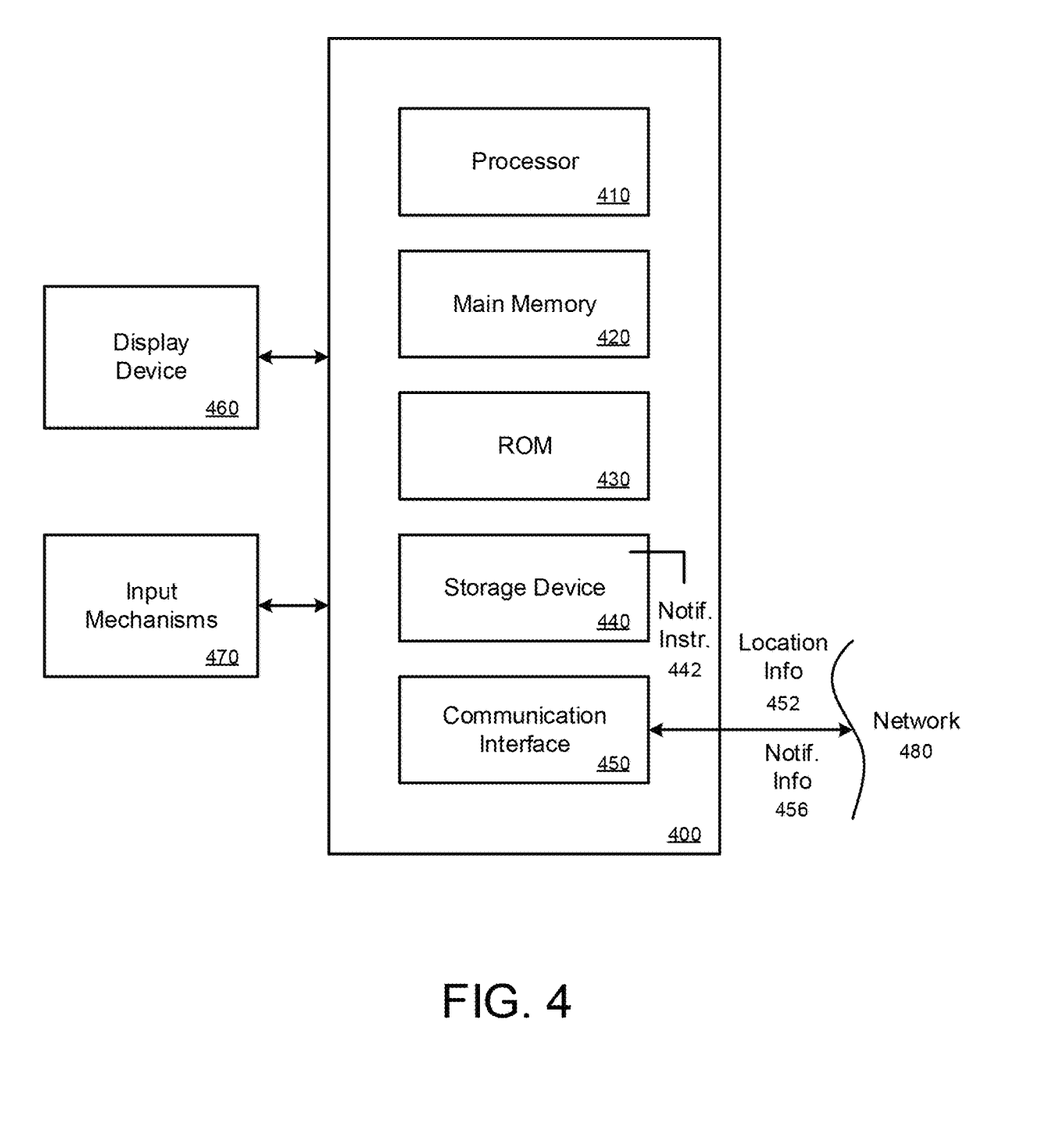
FIG. 4 is a block diagram that illustrates a computer system upon which examples described herein may be implemented.

FIG. 4 is a block diagram that illustrates a computer system upon which examples described herein may be implemented. For example, in the context of FIG. 1, system 100 may be implemented using a computer system such as described by FIG. 4. System 100 may also be implemented using a combination of multiple computer systems as described by FIG. 4.

In one implementation, computer system 400 includes processing resources 410, main memory 420, ROM 430, storage device 440, and a communication interface 450. Computer system 400 includes at least one processor 410 for processing information and a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a solid-state device, a magnetic disk, or an optical disk, is provided for storing information and instructions. For example, the storage device 440 can correspond to a computer-readable medium that stores notification instructions 442 for performing operations discussed with respect to FIGS. 1 through 3C. In another example, the storage device 440 can store notification entries, such as discussed with respect to FIGS. 1 through 3C.

The communication interface 450 can enable computer system 400 to communicate with one or more networks 480 (e.g., cellular network) through use of the network link (wireless and/or using a wire). Using the network link, computer system 400 can communicate with a plurality of devices, such as the mobile computing devices of the clients and service providers. According to some examples, computer system 400 can receive location information 452 from the driver devices (and/or status information from the driver devices, not shown in FIG. 4) via the network link. The processor 410 can use the location information 452 received from the driver devices (as well as other information) to determine whether any of the driver devices satisfy conditions specified by any notification entries. If a driver device satisfies the conditions specified by a notification entry, the processor 410 can identify the notification entry and transmit, via the communication interface 450 over the network 480, notification information 456 corresponding to the identified notification entry to that driver device.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420, such as the price adjustment instructions 442. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
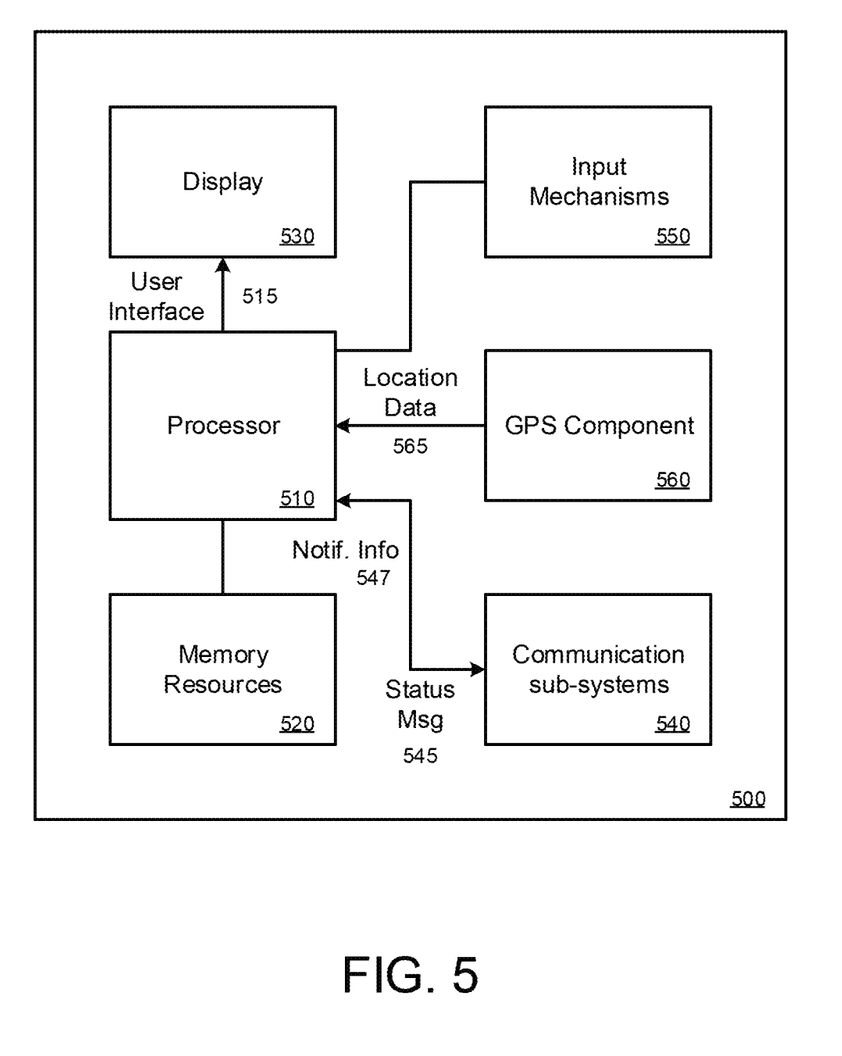
FIG. 5 is a block diagram that illustrates a mobile computing device upon which examples described herein may be implemented.

FIG. 5 is a block diagram that illustrates a mobile computing device upon which examples described herein may be implemented. In one example, a mobile computing device 500 may correspond to a mobile computing device, such as a cellular device that is capable of telephony, messaging, and data services. The mobile computing device 500 can correspond to a client device or a driver device. Examples of such devices include smartphones, handsets or tablet devices for cellular carriers. Mobile computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIGS. 1 through 3C, and elsewhere in the application. Processor 510 is configured, with instructions and data stored in the memory resources 520, to operate a service application as described in FIGS. 1 through 3C. For example, instructions for operating the service application in order to display user interfaces can be stored in the memory resources 520 of the mobile computing device 500.

A service provider, for example, can operate a mobile computing device (such as the mobile computing device 500) to operate a service application. The GPS component 570 can determine location information, such as the current location information 565 of the computing device 500. The location information 565 can be wirelessly transmitted to the notification system (and/or the dispatch system) via the communication sub-systems 540 periodically and/or as part of a status message 545. The status message 545 can be transmitted to the notification system (and/or the dispatch system), for example, in response to the service provider operating the service application. The service provider can indicate that he or she is available to provide services (e.g., is on duty) or indicate when he or she has completed a service and is idle. The notification system can receive the status message 545 as well as the location information 565 from the mobile computing device 500 and determine whether a notification is to be provided to the mobile computing device 500. The notification system can transmit notification information 547 to the mobile computing device 500 via the communication sub-systems 640. The notification information 547 can be processed by the processor 510 to provide text and/or audio corresponding to the notification as part of a user interface 515 on the display 530.

For example, the processor 510 can provide a variety of content to the display 530 by executing instructions and/or applications that are stored in the memory resources 520. One or more user interfaces 515 can be provided by the processor 510, such as a user interface for the service application. While FIG. 5 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing system implementing an on-demand transport service for a geographic region, the computing system comprising:
    a network communication interface to communicate, over one or more wireless networks, with (i) computing devices of drivers of the on-demand transport service, and (ii) computing devices of requesting users of the on-demand transport service;
    one or more processors; and
    a memory storing instructions that, when executed by the one or more processors, cause the computing system to:
        receive, over the one or more wireless networks, (i) transport requests from the computing devices of the requesting users, each transport request indicating at least a pickup location, and (ii) location data from the computing devices of the drivers, the location data indicating current locations of the drivers operating throughout the geographic region, wherein the location data and the transport requests are used to determine utilization conditions for a plurality of sub-regions of the geographic region, the utilization condition for each sub-region corresponding to a number of available drivers within the sub-region as compared to a number of transport requests comprising pickup locations within the sub-region;
        determine, based on (i) the transport requests received from the computing devices of the requesting users, and (ii) the location data received from the computing devices of the drivers, that the utilization condition of a given sub-region exceeds a predetermined utilization threshold; and based on the utilization condition for the given sub-region exceeding the predetermined utilization threshold, transmit data to the computing devices of a plurality of drivers to cause the computing devices of a plurality of drivers to display, on a map user interface for the computing devices of the plurality of drivers, (i) a geofence feature, defined by three or more location data points, that encompasses the given sub-region, and (ii) a notification indicating that the given sub-region has a utilization condition that exceeds the predetermined utilization threshold.

2. The computing system of claim 1, wherein the executed instructions further cause the computing system to:

receive, over the one or more wireless networks, status information from each of the computing devices of the drivers, the status information indicating at least an on-duty or an off-duty status.

3. The computing system of claim 2, wherein the executed instructions cause the computing system to select the plurality of drivers that are to receive the map user interface based on the status information indicating a common status of the plurality of drivers.

4. The computing system of claim 3, wherein the common status comprises the on-duty status.

5. The computing system of claim 1, wherein the notification comprises audio content that is outputted on each computing device of each of the plurality of drivers.

6. The computing system of claim 1, wherein the notification comprises textual information indicating that the utilization condition for the given sub-region exceeds the predetermined utilization threshold.

7. The computing system of claim 1, wherein the notification comprises event information that indicates an event comprising a source of the utilization condition of the given sub-region.

8. The computing system of claim 7, wherein the map user interface displayed on each respective computing device of each of the plurality of drivers comprises (i) a first graphic marker identifying the current location of the respective computing device, and (ii) a second graphic marker identifying an event location corresponding to the event.

9. A non-transitory computer-readable medium storing instructions that, when executed by one or more processors, cause the one or more processors to:

communicate, over one or more wireless networks, with (i) computing devices of drivers of an on-demand transport service, and (ii) computing devices of requesting users of the on-demand transport service;

receive, over the one or more wireless networks, (i) transport requests from the computing devices of the requesting users, each transport request indicating at least a pickup location, and (ii) location data from the computing devices of the drivers, the location data indicating current locations of the drivers operating throughout a geographic region, wherein the location data and the transport requests are used to determine utilization conditions for a plurality of sub-regions of the geographic region, the utilization condition for each sub-region corresponding to a number of available drivers within the sub-region as compared to a number of transport requests comprising pickup locations within the sub-region;

determine, based on (i) the transport requests received from the computing devices of the requesting users, and (ii) the location data received from the computing devices of the drivers, that the utilization condition of a given sub-region exceeds a predetermined utilization threshold; and based on the utilization condition for the given sub-region exceeding the predetermined utilization threshold, transmit data to the computing devices of a plurality of drivers to cause the computing devices of the plurality of drivers to display, on a map user interface for the computing devices of the plurality of drivers, (i) a geofence feature, defined by three or more location data points, that encompasses the given sub-region, and (ii) a notification indicating that the given sub-region has a utilization condition that exceeds the predetermined utilization threshold.

10. The non-transitory computer-readable medium of claim 9, wherein the executed instructions further cause the one or more processors to:

receive, over the one or more wireless networks, status information from each of the computing devices of the drivers, the status information indicating at least an on-duty or an off-duty status.

11. The non-transitory computer-readable medium of claim 10, wherein the executed instructions cause the one or more processors to select the plurality of drivers that are to receive the map user interface based on the status information indicating a common status of the plurality of drivers.

12. The non-transitory computer-readable medium of claim 11, wherein the common status comprises the on-duty status.

13. The non-transitory computer-readable medium of claim 9, wherein the notification comprises audio content that is outputted on each computing device of each of the plurality of drivers.

14. The non-transitory computer-readable medium of claim 9, wherein the notification comprises textual information indicating that the utilization condition for the given sub-region exceeds the predetermined utilization threshold.

15. The non-transitory computer-readable medium of claim 9, wherein the notification comprises event information that indicates an event comprising a source of the utilization condition of the given sub-region.

16. The non-transitory computer-readable medium of claim 15, wherein the map user interface displayed on each respective computing device of each of the plurality of drivers comprises (i) a first graphic marker identifying the current location of the respective computing device, and (ii) a second graphic marker identifying an event location corresponding to the event.

17. A computer-implemented method of implementing an on-demand transport service for a geographic region, the method being performed by one or more processors and comprising:

communicating, over one or more wireless networks, with (i) computing devices of drivers of the on-demand transport service, and (ii) computing devices of requesting users of the on-demand transport service;

receiving, over the one or more wireless networks, (i) transport requests from the computing devices of the requesting users, each transport request indicating at least a pickup location, and (ii) location data from the computing devices of the drivers, the location data indicating current locations of the drivers operating throughout the geographic region, wherein the location data and the transport requests are used to determine utilization conditions for a plurality of sub-regions of the geographic region, the utilization condition for each sub-region corresponding to a number of available drivers within the sub-region as compared to a number of transport requests comprising pickup locations within the sub-region;

determining, based on (i) the transport requests received from the computing devices of the requesting users, and (ii) the location data received from the computing devices of the drivers, that the utilization condition of a given sub-region exceeds a predetermined utilization threshold; and based on the utilization condition for the given sub-region exceeding the predetermined utilization threshold, transmitting data to the computing devices of a plurality of drivers to cause the computing devices of the plurality of drivers to display, on a map user interface for the computing devices of the plurality of drivers, (i) a geofence feature, defined by three or more location data points, that encompasses the given sub-region, and (ii) a notification indicating that the given sub-region has a utilization condition that exceeds the predetermined utilization threshold.

18. The method of claim 17, further comprising:

receiving, over the one or more wireless networks, status information from each of the computing devices of the drivers, the status information indicating at least an on-duty or an off-duty status.

19. The method of claim 18, wherein the one or more processors select the plurality of drivers that are to receive the map user interface based on the status information indicating a common status of the plurality of drivers.

20. The method of claim 19, wherein the common status comprises the on-duty status.

* * * * *